July 7, 1931.  A. H. RICHARDS  1,813,639
BICYCLE
Filed Oct. 11, 1930

Inventor
Andrew H. Richards,
By C. A. Snow & Co.
Attorneys.

Patented July 7, 1931

1,813,639

UNITED STATES PATENT OFFICE

ANDREW H. RICHARDS, OF GRAND JUNCTION, COLORADO

BICYCLE

Application filed October 11, 1930. Serial No. 488,119.

This invention relates to bicycles and velocipedes or the like, the primary object of the invention being to provide a bicycle especially designed for the use of children.

An important object of the invention is to provide a bicycle including a main bar having a substantially horizontal portion providing the seat rest of the device, the length and construction of the horizontal portion being such as to permit the seat to be adjusted forwardly or rearwardly, so that the distance between the ground surface and seat will be equal to the distance between the pedals and the seat, to permit the bicycle to be used with facility.

Another object of the invention is to provide a sleeve mounted on the horizontal portion of the main bar of the bicycle, said sleeve providing the bicycle seat mount, means being provided for holding the sleeve in various positions of adjustment.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
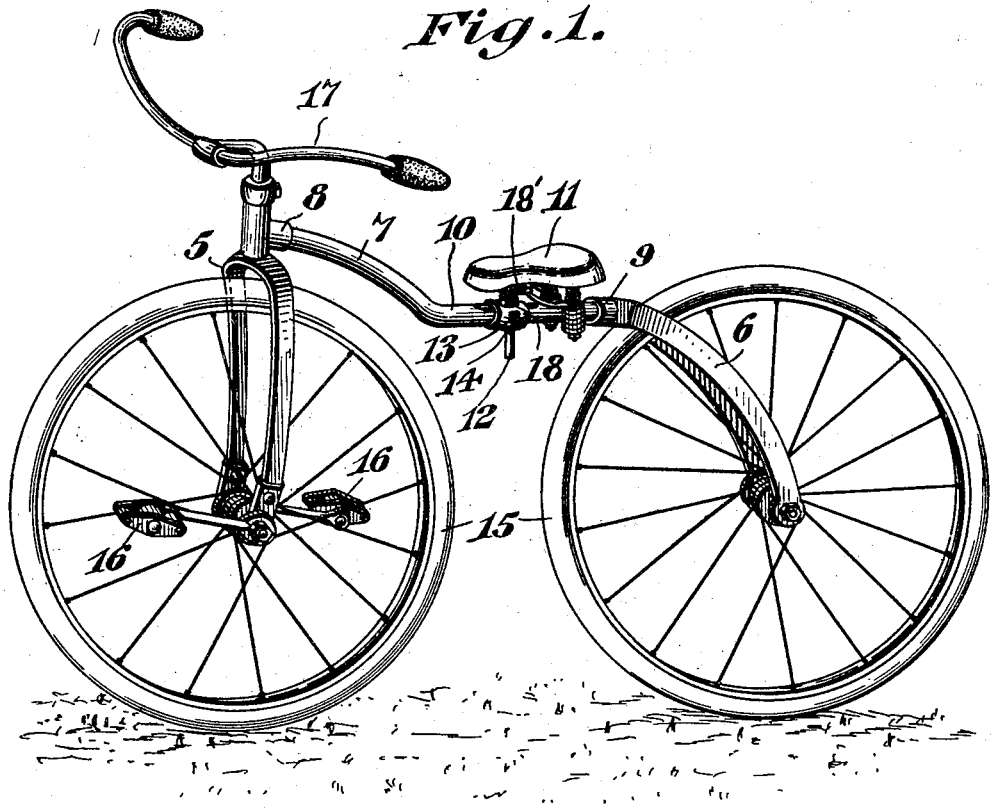
Figure 1 illustrates a perspective view of a bicycle constructed in accordance with the invention.
Figure 2:
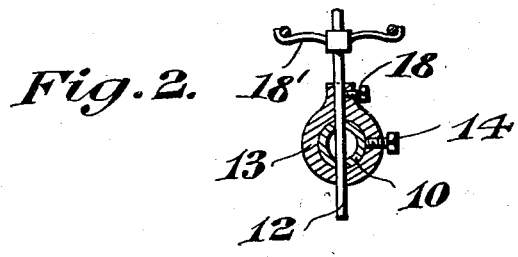
Fig. 2 is a transverse section through the seat.

Referring to the drawings in detail, the bicycle comprises a front fork 5 and a rear fork 6, the front and rear forks being connected by means of the main bar 7, which is fitted in tubular members 8 and 9 respectively of the front and rear forks.

As clearly shown by the drawings, the main bar 7 is curved throughout a portion of its length, where it merges into a substantially long horizontal section 10 that provides the support for the seat proper, the seat being indicated by the reference character 11.

The horizontal portion 10 is provided with a longitudinal slot extended therethrough, which slot accommodates the seat post 12 which also passes through the sleeve 13 which is mounted on the horizontal portion 10, there being provided a bolt 14 extending through the sleeve, for engaging the horizontal section 10, to hold the sleeve and seat in various positions of adjustment longitudinally of the horizontal section.

A bolt 18 extends laterally through the sleeve and engages the post 12, to hold the seat in its positions of vertical adjustment. Arms 18' extend laterally from the post 12 and form rests for the forward end of the seat 11.

The usual wheels 15 are mounted in the forks 5 and 6, the front wheel being supplied with pedals 16 for operating the bicycle. Handle bars 17 are connected with the front fork 5 for steering the bicycle.

From the foregoing it will be seen that due to the construction shown and described, the person seated on the seat 11, may, when the seat has been properly adjusted, allow his feet to touch the ground surface, to hold the bicycle in an upright position while the bicycle is not moving, and that the person may, by lifting his feet, place them on the pedals to operate the bicycle.

I claim:

A bicycle comprising a frame, said frame including a main bar, front and rear forks connected with the frame, said main bar having a horizontal section, said horizontal section having a slot, a seat, a seat post secured to the seat and extending through the slot, a sleeve mounted on the horizontal section, said sleeve having an opening to receive the seat post, and means for securing the sleeve in various positons of adjustment.

In testimony that I claim the foregoing as my own, I have hereto affixed my signature.

ANDREW H. RICHARDS.